(No Model.)
E. DEDERICK.
CAR STARTER.
No. 374,943. Patented Dec. 20, 1887.
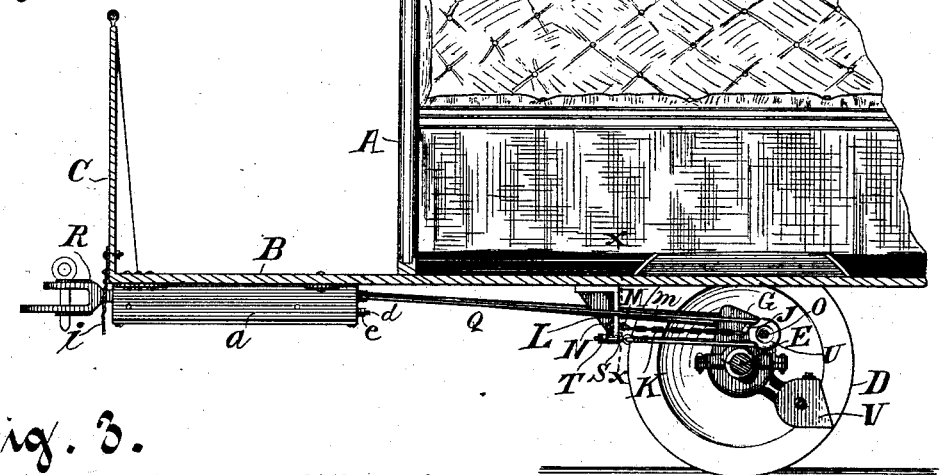
Fig. 1.
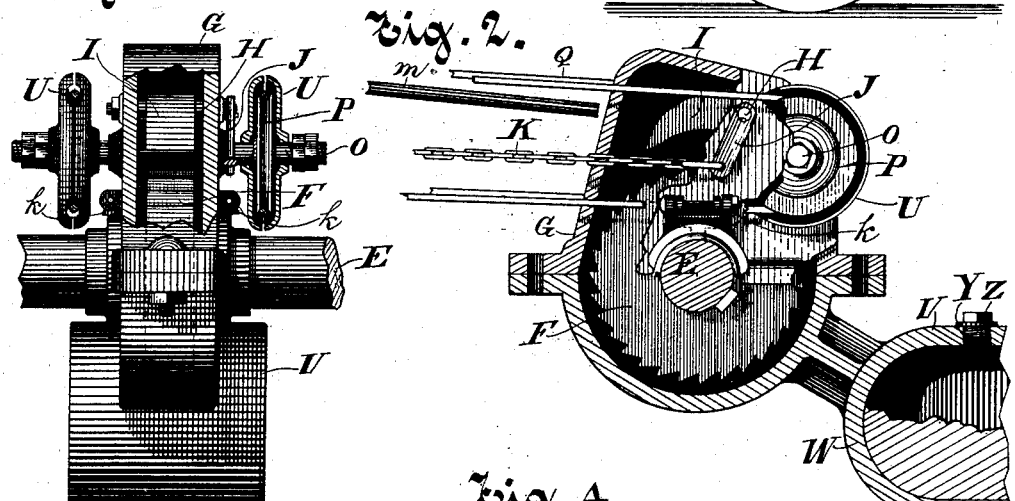
Fig. 2. Fig. 3.
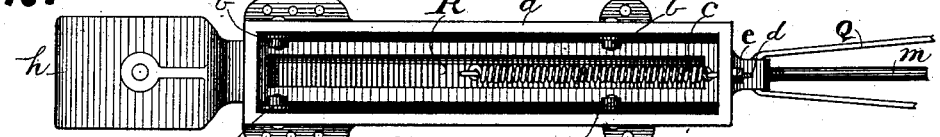
Fig. 4.
Fig. 5. Fig. 6.
Witnesses:
O. N. Kuney
E. R. Inman
Inventor:
Ezra Dederick
By Ervin H. Benedict
Attorneys

UNITED STATES PATENT OFFICE.

EZRA DEDERICK, OF MILWAUKEE, WISCONSIN.

CAR-STARTER.

SPECIFICATION forming part of Letters Patent No. 374,943, dated December 20, 1887.

Application filed June 11, 1887. Serial No. 240,984. (No model.)

*To all whom it may concern:*

Be it known that I, EZRA DEDERICK, of Milwaukee, in the county of Milwaukee and State of Wisconsin, have invented new and useful Improvements in Car-Starters; and I do hereby declare the following to be a full, clear, and exact description of said invention, reference being had to the accompanying drawings, and to the letters or figures of reference marked thereon, which form a part of this specification.

My invention consists in the peculiar form, construction, arrangement, and combination of the parts of the mechanism embodied in my device for starting cars, which device is attached to a car and is adapted to secure the initial motion or rotation of the wheels.

In the drawings, Figure 1 is a perspective view of a portion of the front end of a street-car with my device attached thereto. Fig. 2 is a side view of that part of my device which is connected directly with the axle of the car, the outer cases being removed to show interior parts. Fig. 3 is a rear view of the parts of the device shown in Fig. 2, as seen at right angles to the view shown in Fig. 2, a part of the cases being removed to show interior parts. Fig. 4 is a vertical longitudinal section of the parts of my device shown in Fig. 1 attached to the under side of the platform. Fig. 5 shows the under side of the parts seen in Fig. 4, the bottom of the case being removed to show interior parts. Fig. 6 is a rear view on line X X of Fig. 1 of the bracket attached to the under side of the car.

My device is adapted to be attached to any and all kinds of vehicles for securing an easy and prompt starting of the vehicle by the power used for hauling it, my drawings and description having reference only to its attachment to a street-car.

In the drawings, A is the body of a car.

B is the front platform, and C is the dash-board or guard.

D is a wheel of the car, rigid to the axle E, which axle is supported and rotates in bearings underneath and affixed to the car in the ordinary way.

Rigid on the axle E, I affix a ratchet-wheel, F. About and inclosing the ratchet-wheel F and supported and oscillating on the axle E is a case, G, which for convenience of construction and attachment is made in two parts—an upper and a lower part—which parts are bolted together rigidly. In the upper part of this case an arbor, H, passes laterally through the case and is supported and oscillates therein. This arbor is provided with a pawl, I, which pawl is adapted to engage the teeth of the ratchet-wheel F and when in use force the ratchet forward. A lever-arm, J, is also rigidly secured to the arbor H, to the outer end of which arm J an anchor-chain, K, is connected, the other extremity of the chain being secured to the bracket L by and through an eyebolt, M, provided with a screw-thread on its end, receiving a nut, N, thereon. The bracket L is rigidly secured to the bottom of the car, and the stem of the eyebolt M passes through the bracket, and by means of the nut N the length of the anchor-chain may be increased or diminished, as desired. A small axle, O, also passes laterally through the top of the case G and is supported and rotates therein. Secured rigidly on this axle O are two pulleys, P P, one on each side of the case G, over which pulleys a cable, Q, runs. The cable Q is passed through an aperture in the end of the draw-bar R and is doubled back, its ends being respectively carried back over the pulleys P P and turned forward again and secured to the bracket L by and through eyebolts S S, which eyebolts are provided with screw-threads on their stems and with nuts T T turning thereon. These eyebolts pass through the bracket L, and by means of the nuts turning thereon the cable may be lengthened or shortened, as desired. The pulleys P P are also each inclosed in a case, U U.

The pawl I is located directly above the car-axle E, and to retain it in this location against the weight of the anchor-chain K and the cable Q a counterpoise, V, is used. This counterpoise V consists of a rigid arm projecting at a downward and outward angle from the case G below the center of the axle E, terminating in a hollow shell, W, provided with an aperture, Y, through which aperture weighty material may be introduced or removed from the shell, whereby the gravity of the counterpoise may be increased or diminished, as desired. The aperture Y is closed by a screw-cap or plug-nut, Z. The draw-bar R is supported and moves endwise in the case *a* on flanged rollers b b, supported and rotating on arbors fixed in the inner sides of the case a. The case a is rigidly secured to the under side of the car beneath the platform B. A coiled-wire spring, c, is secured at one end to the draw-bar R on the under side, and at the other end the spring is secured adjustably to the rear end of the case a by an eyebolt, d, having a screw-thread on its stem and provided with a nut, e, turning thereon, whereby the length and strength of the spring may be increased or diminished, as desired. The strength of this spring is such as under ordinary work to hold the draw-bar back in the position shown in Figs. 4 and 5, and is intended and adapted under the greater strain of the hauling power required for starting a car with a full load to expand or extend sufficiently to permit the draw-bar to be withdrawn forwardly in and through the case a a little distance, whereby the pull on the cable Q will throw the upper part of the case G forward, throwing the pawl I over in engagement with the ratchet-wheel F, starting the ratchet-wheel and thereto-connected car-wheel D forward on their rotation. A lug, f, integral with the case projects downwardly from the top thereof into a longitudinal recess in the draw-bar R, and is adapted to impinge against the draw-bar at the end of the recess therein at the point g and prohibit the further forward movement of the draw-bar. The propelling-power is attached to the car by and through connection made with the draw-bar R at its head h. This head h is made bifurcated, having upper and lower jaws, the lower jaw being made very broad to support the evener thereon, and, by reason of its breadth in connection with the upper jaw, to prevent the evener from tipping down at either end, or, in other words, to support the evener in position horizontally. A canvas apron, i, is attached to the car C and is adapted to exclude dirt from the front end of the case a. An aperture for lubricating purposes through the upper part of the journal-box is covered by the hinged lid k.

It will be understood that the counterpoise V is so located and loaded as by its gravity to retain the case G and its supported mechanism in the position shown in Figs. 1 and 2 at all times, except when, with a heavy load in the car, an unusually great force is exerted on the draw-bar to start the car forward when standing still, or with increased rapidity from a slow motion. When under such severe strain the draw-bar will be pulled forward against the yielding resistance of spring c, whereby, through the cable Q, the upper part of the case G will be thrown forward and the tension of the anchor-chain K will be relaxed, and the pawl I be thereby permitted to fall into engagement with the ratchet-wheel F, and under the continued forward severe strain on the draw-bar, acting on the cable Q and pawl I against the ratchet-wheel, the ratchet and car wheel D will be caused to rotate, starting the car forward on its travel. As soon as the car has started and the amount of force necessary to pull it along is diminished by its acquired momentum, the spring c will draw the bar R back to the position shown in Figs. 4 and 5, and the counterpoise V will by gravity return the case G and its supported mechanism to the position shown in Figs. 1 and 2. A stay-rod, m, is affixed at its front end rigidly to the rear end of the draw-bar R. This stay-rod m passes through an aperture therefor in the bracket L, in which it is supported and has endwise movement. This rod terminates immediately in front of the upper part of the case G, and is adapted to prevent the case G from tipping over at the top toward the front, except only when the draw-bar R is drawn forward in the case a, removing the rod m from immediately in front of the case G.

What I claim as new, and desire to secure by Letters Patent, is—

1. In a car-starter, a car-axle and a ratchet rigid thereon, in combination with a case supported and oscillating on the axle, and a hollow adjustable counterpoise attached thereto below and at one side of its pivotal point, said case being provided with a gravity-pawl pivoted in its upper part and being connected with a movable draw-bar, substantially as described.

2. A ratchet-wheel rigid on the car-axle, in combination with a gravity-pawl supported above the ratchet-wheel in a case supported and oscillating on the car-axle, and a cable secured at one end to the car and at the other end to a movable draw-bar and running over a pulley supported and rotating in the upper part of the case, substantially as described.

3. A ratchet-wheel rigid on the axle of a car, in combination with a gravity-pawl supported above the ratchet-wheel in a weighted case supported and oscillating on the car-axle, and an anchor-chain secured at one end to the car and at the other end to an arm rigid on the axle of the pawl, whereby by the tipping of the weighted case the pawl is released from engagement with the ratchet-wheel, the upper part of said case being connected to the draw-bar, substantially as described.

4. A weighted case, G, supported and oscillating on the axle of the car and the thereto-attached mechanism, whereby the case is intermittingly and automatically in engagement with and released from the axle, in combination with and connected to a movable draw-bar supported on the under side of the car, substantially as described.

5. In a car-starter, a movable draw-bar, R, in combination with a cable, Q, connecting the draw-bar with a movable mechanism engaging with the car-axle, and a stay-rod, m, substantially as described.

6. In a car-starter, a draw-bar, R, supported and movable endwise beneath the car, in combination with an equalizing-spring, c, connected at one end to the bar R and at the other end made rigid to the car, and the cable Q, connecting the draw-bar with mechanism engaging with the car-axle, substantially as described.

7. In a car-starter, a draw-bar, R, supported beneath the under part of the car and integral therewith, and a bifurcated draw-head, h, the lower jaw of the bifurcated head being made very wide, substantially as described.

8. In a car-starter, a draw-bar, R, supported and having endwise movement in a case, a, beneath the car, in combination with a lug, f, integral with the case a and adapted to engage with and limit the forward motion of the draw-bar R, substantially as described.

9. In a car-starter, a draw-bar, R, supported and movable endwise beneath the car, which draw-bar is connected with mechanism engaging intermittingly with the car-axle, in combination with a spring, c, connected at one end to the bar R and at the other end connected with the car, and a screw-thread on the stem of the eyebolt at the end of the spring, and a nut thereon, whereby the length and strength of the spring may be increased or diminished, substantially as described.

In testimony whereof I affix my signature in presence of two witnesses.

EZRA DEDERICK.

Witnesses:
  C. T. BENEDICT,
  C. H. KEENEY.